Figure 1:
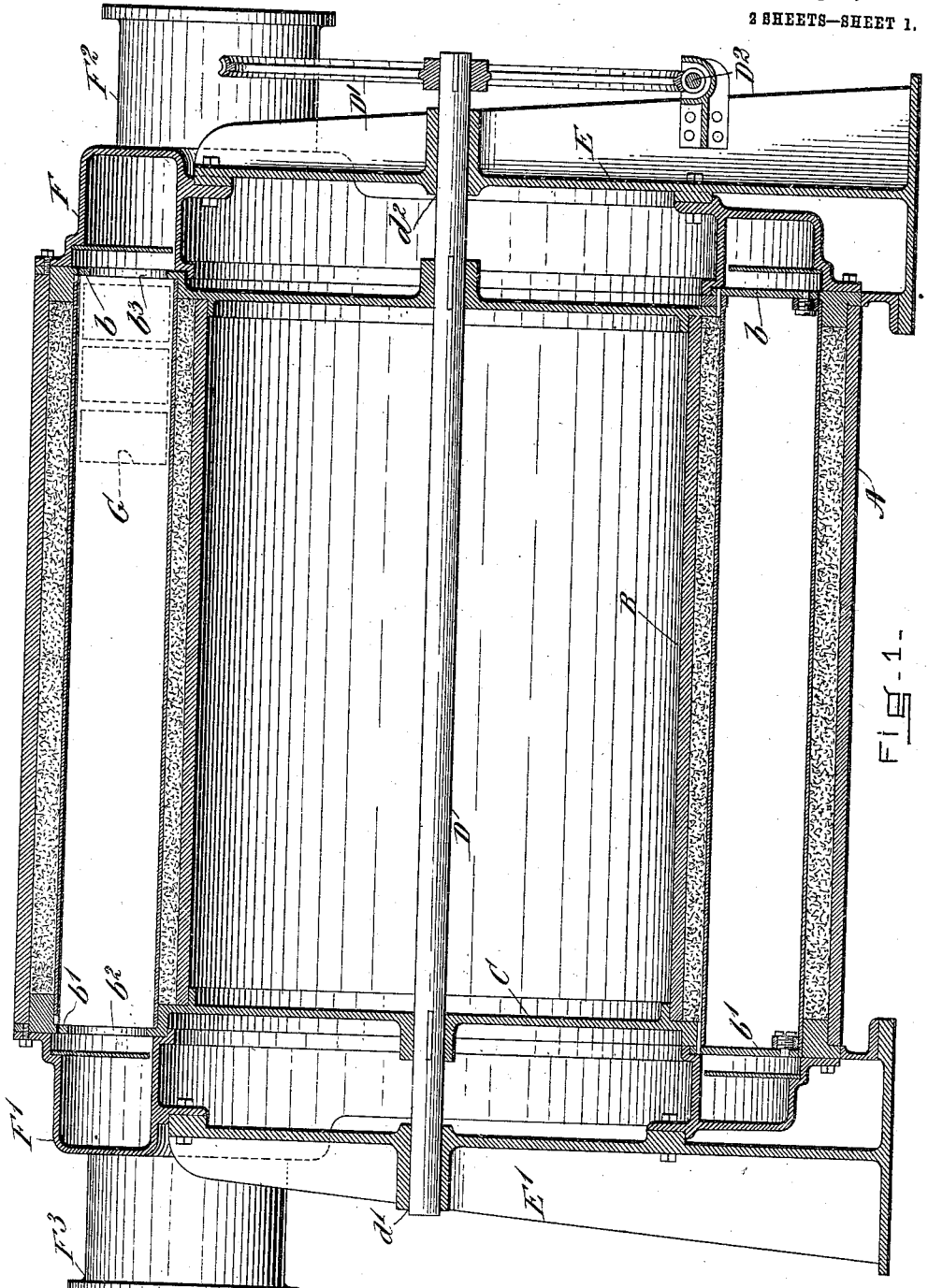

L. V. ESTES & W. FORWARD.
METHOD OF RESHAPING COLLARS AND ANALOGOUS ARTICLES.
APPLICATION FILED JUNE 5, 1909.

966,435.

Patented Aug. 9, 1910.
2 SHEETS—SHEET 1.

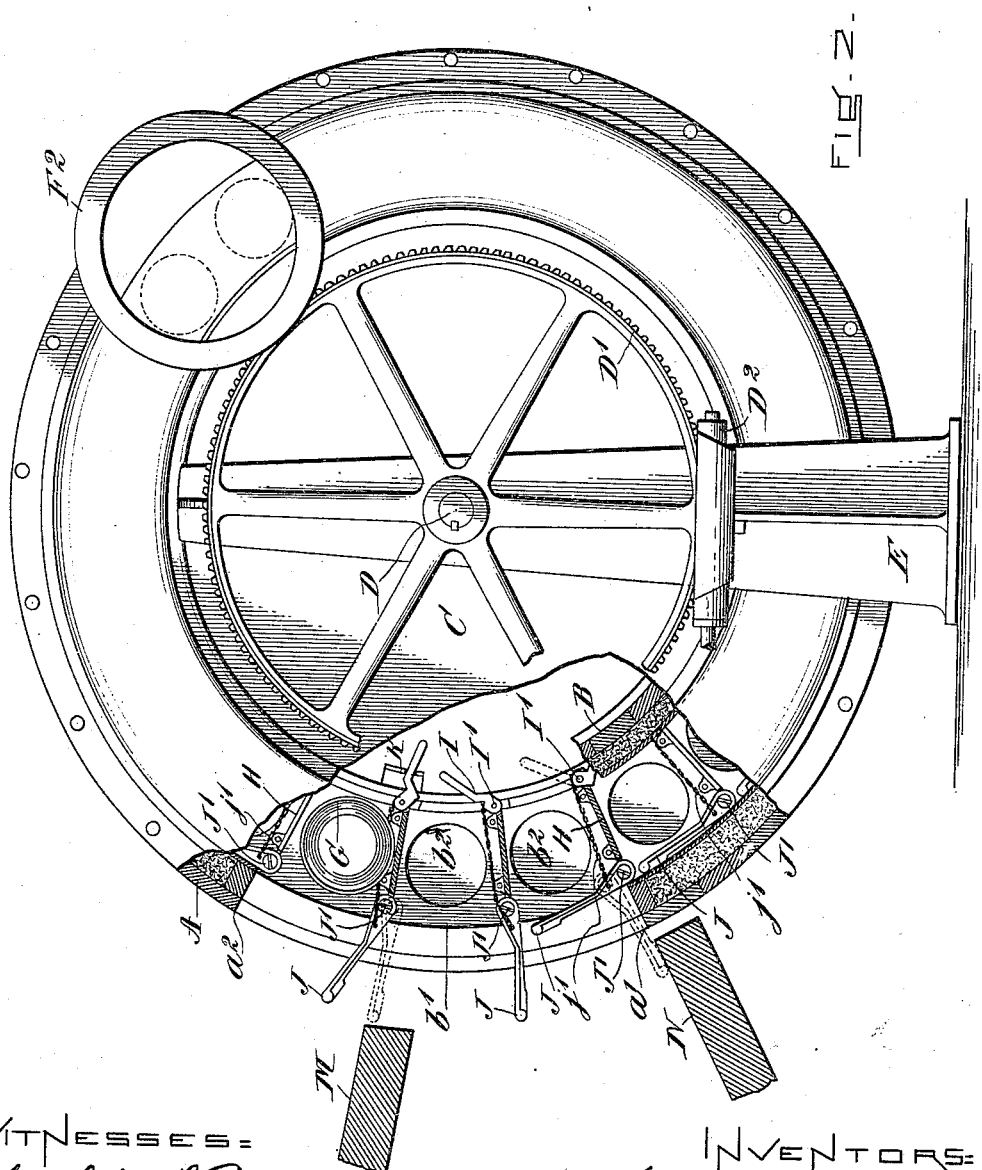

UNITED STATES PATENT OFFICE.

LORING V. ESTES AND WILLIAM FORWARD, OF TROY, NEW YORK, ASSIGNORS TO CLUETT, PEABODY & COMPANY, OF TROY, NEW YORK, A CORPORATION OF NEW YORK.

METHOD OF RESHAPING COLLARS AND ANALOGOUS ARTICLES.

966,435. Specification of Letters Patent. Patented Aug. 9, 1910.

Application filed June 5, 1909. Serial No. 500,277.

*To all whom it may concern:*

Be it known that we, LORING V. ESTES and WILLIAM FORWARD, both citizens of the United States, and residents of Troy, in the county of Rensselaer and State of New York, have invented new and useful Improvements in Methods of Reshaping Collars and Analogous Articles, of which the following is a specification.

Our invention relates to the manufacture of such articles as collars and particularly to the manufacture of turn-down collars which require more careful shaping than other kindred articles in order to be sent to the consumer in perfect condition.

Our invention consists in a method of reshaping finished articles of this character and is particularly addressed to the re-formation of collars after they have been submitted to their final inspection at the factory.

At present the last operation in the manufacture of collars is the laundrying during which the collars are starched, ironed and shaped; it is necessary, however, to submit the collars to inspection after the laundrying operation in order to discover such defects as may exist which were not detected by any previous inspection after earlier stages in the manufacture. The laundrying operation occasionally develops and makes apparent defects which previously have been concealed, and also, some defects in the finished article are occasionally produced in the laundrying operation. In the case of such articles as turn-down collars, this final inspection of the finished goods which are as a rule, tied together in bundles of a dozen each, necessitates the opening of the folds of the collars by the inspector. This handling distorts the collars more or less from the correct shape previously given to them in the laundry, and therefore, deteriorates the appearance of the goods and interferes with the proper fitting thereof on the first occasion of wear by the user. The defects caused by final inspection are, it is true, superficial and temporary for the reason that the first time the collar is laundried after being worn, skilful laundrying will restore it to the correct shape which was given to it originally by the manufacturer's laundry. Nevertheless, it is desirable from the point of view not only of the use, but also of the retailer to whom attractiveness in articles for sale is a desideratum, that the distortions from correct shape occasioned by the necessary final inspection of the goods shall be corrected.

The object of our method herein described is to restore finished collars and the like to their proper shape after they have been distorted by the final inspection, without necessitating the repetition of any of the manufacturing processes, including laundrying, through which the articles have already passed and which, indeed, if repeated, would necessitate still further inspection and be therefore useless to accomplish our purpose.

We are aware that the shaping of collars in the laundry is an old and well known step in the finishing process, but so far as we are informed, the shaping heretofore has involved the heating and drying of the collars which when confined in the desired shape are moist either throughout their body or structure or else in such portions, such as the folds or turns, where the shaping operation has the greatest effect. Thus, the laundry shaping of the collars and the like has heretofore involved the preliminary moistening and subsequent drying of the article which is held or confined in proper shape until the drying is complete.

Remoistening and re-shaping of finished collars after final inspection would hardly be a practicable method of correcting the distortions due to inspection. We have discovered however, that if such a finished article as a collar has been distorted as by inspection and it is then tightly rolled and held either alone or in a roll with other articles of the same nature, and is then, although dry, subjected for a sufficient time to dry heat, the effect of the confinement and heat so remolds the starch incorporated with the fabric that the collar or similar article will emerge from this treatment correctly reshaped and in the same perfect condition as to shape as when it came from the laundry. Furthermore, such treatment by dry heat and confinement will improve the condition and finish of collars and the like, especially in their appearance in parcels or bundles such as are ordinarily exposed for sale.

In order fully to describe our improved method and means for efficiently carrying it out, we show in the accompanying drawings an apparatus whereby our improved method may be practiced. This apparatus is shown and described in an application for Letters Patent filed concurrently herewith by us Serial No. 500276 and the invention and improvements incorporated therein are reserved for claim in the said application.

In these accompanying drawings, Figure 1 is a vertical longitudinal section of a heating apparatus; and Fig. 2 is an end elevation viewed from the right side of Fig. 1, partially broken away, to disclose the interior arrangements.

The apparatus illustrated in these drawings consists of a cylindrical shell A which is composed preferably of good heat insulating material, the said shell being segmental in form terminating at $a'$ and $a^2$ as seen in Fig. 2. Inside the shell A the carrier B is mounted. This carrier is cylindrical in form and has its inner walls preferably constructed of good heat insulating material, this cylindrical inner portion being supported at its ends by the spider rings C. Upon the outer peripheral portions of these spider rings the flanges $b$, $b$, are formed, these flanges being apertured at $b^3$ and $b^2$. Radial partitions H are secured at their ends to the flanges $b$, $b'$ and serve to divide the carrier into a suitable number of peripheral compartments; the apertures $b^2$ $b^3$ are located in the flanges at the ends of these compartments. We provide also gates J which are pivoted at $J'$ at or near the outer edges of the radial partitions H; these gates are so proportioned and placed that, when closed they pass just within the inner surface of the segmental shell A. Closure of these gates is accomplished by the mechanism illustrated in Fig. 2; pivoted latches I are mounted around the inner periphery of the carrier upon pivots $I'$ and are secured to the gates J by flexible connections such as the chains $j'$. A stop K is secured to a stationary portion of the apparatus, to wit, the outside of the segmental hot air head $F'$. The location of this stop is shown in Fig. 2. The rotation of the carrier B is occasioned by the shaft D which is keyed to the spider rings C and to the worm wheel $D'$; the latter is slowly rotated by means of the worm $D^2$, which may derive movement from any suitable source. The hot air heads F, $F'$ constitute preferably part of the casting of the stationary frame and are secured to the standards E, $E'$ and extend around the ends of the apparatus so as to deliver and remove air from the compartments in the periphery of the carrier. Air is introduced into the apparatus through the conduit $F^2$ and escapes through a similar conduit $F^3$.

For the proper confinement and re-shaping of such articles as collars by the above described apparatus, we provide a suitable number of metal rings G. These rings can easily be rolled into any one of the compartments in the carrier through the aperture between the edges $a'$, $a^2$ of the segmental shell when the gates J are open and can as easily roll out of the said compartments when released by the opening of the gates. For the proper introduction and removal of the holders G, I provide an inclined shelf M and a lower shelf N.

An operation of the above described apparatus is as follows: After final inspection, collars, usually tied in bundles of a dozen each, are tightly rolled and a bunch inserted in each of the holders G which are of such proportions as to retain the bunch of collars in its rolled condition. The movement of the carrier B brings its compartments successively abreast of the aperture in the shell A, each compartment moving from the edge $a'$ to the edge $a^2$ of said shell. As one of the open gates J approaches the lower edge of the shelf M, a number of holders G each containing a roll or bunch of collars is allowed to roll down the shelf over the gate J and into the compartment. As the carrier continues its movement, the latch I strikes the stop K and is depressed thereby, drawing the chain $J'$ and closing the gate J which then passes under the edge $a^2$ of the shell. Meanwhile dry hot air is blown through the apparatus from the aperture $F^2$ to the aperture $F^3$ passing from the hot air heads F, $F'$ through all of the compartments in the carrier which are, for the time being covered by the shell A. As each compartment emerges past the edge $a'$ of the shell A the gate J falls open of its own weight, being assisted to do so by the weight of the holders G, and the holders roll down upon the shelf when the reshaped collars can be removed and put in their boxes. Thus, by the operation of the above described apparatus our method of reshaping finished collars by submitting them while dry and in a confining holder to dry heat, may be advantageously performed.

What we claim and desire to secure by Letters Patent is:

The herein described method of reshaping laundried collars and analogous articles in a dry state, which consists in rolling said collars in a constrained position, confining them immovably in such position, and then subjecting them while so confined and immovable to dry heat for a predetermined length of time to cause the starch in said collars to reset.

Signed by us at Troy, New York, this twenty-fourth day of May 1909.

LORING V. ESTES.
WILLIAM FORWARD.

Witnesses:
KATHERINE A. CARRALL,
CHARLES M. HORTON.